United States Patent [19]
Knifton

[11] 3,892,788
[45] July 1, 1975

[54] SELECTIVE CARBOXYLATION PROCESS
[75] Inventor: John F. Knifton, Poughquag, N.Y.
[73] Assignee: Texaco Inc., New York, N.Y.
[22] Filed: Jan. 28, 1974
[21] Appl. No.: 437,251

Related U.S. Application Data
[63] Continuation-in-part of Ser. No. 223,015, Feb. 2, 1972, Pat. No. 3,819,669.

[52] U.S. Cl........ 260/410.9 R; 260/410.6; 260/413; 260/497 A; 260/533 A
[51] Int. Cl...................... C07c 51/14; C07c 67/00
[58] Field of Search......... 260/410.9 R, 413, 497 B, 260/533 AN

[56] References Cited
UNITED STATES PATENTS
3,681,415  8/1972  Schell.................. 260/410.9 R
3,718,676  2/1973  Kehoe et al.................. 260/413
3,819,669  6/1974  Knifton.................. 260/410.9 R Primary Examiner—Donald G. Daus
Assistant Examiner—Diana G. Rivers
Attorney, Agent, or Firm—T. H. Whaley; C. G. Ries; Bernard Marlowe

[57] ABSTRACT

This invention relates to a process for selectively carboxylating alpha ($\alpha$) olefins present in a mixture of $\alpha$-olefins and internal olefins by contacting said olefin mixture with carbon monoxide and hydroxyl-containing reactants, in the presence of an empirically derived class of three (3) component catalysts consisting of ligand stabilized, platinum(II) dihalide complexes in combination with Group IVB metal halides.

11 Claims, No Drawings

SELECTIVE CARBOXYLATION PROCESS

This application is a continuation-in-part of Ser. No. 223,015, filed in the U.S. Patent Office on Feb. 2, 1972 now U.S. Pat. No. 3,819,669.

SUMMARY OF THE INVENTION

This invention relates to the selective and preferential catalytic addition of carbon monoxide and a hydroxylated coreactant to alpha ($\alpha$) olefins contained in mixtures of alpha ($\alpha$) and internal olefins, to obtain linear alkanoic (fatty) acids or their esters in the presence of an improved, empirically derived class of homogeneous catalysts consisting of ligand-stabilized, platinum-(II) dihalides complexed with Group IVB metal halides.

More specifically, this invention concerns the discovery of a relatively small class of the above-mentioned platinum containing catalysts that are capable of preferentially carboxylating $\alpha$-olefins in alpha-olefin-internal olefin mixtures by the process described below under relatively mild reaction conditions using experimentally derived, homogeneous catalysts whose preparation and use are described more fully below.

Selective carboxylation as defined throughout this disclosure refers to the process of preparing linear alkanoic (fatty) acids or esters of the type $R_2CH_2COOR_1$ by the catalytic addition of carbon monoxide and a hydroxylated coreactant, $R_1OH$ to one or more alpha (1—) olefins having the general structure $R_2CH=CH_2$, in accordance with equation 1, infra, in the presence of an internal olefin fraction, consisting of one or more internal olefins having the general structure $R_6R_4C=CR_3R_5$, which does not undergo substantial carboxylation under the conditions of the instant invention.

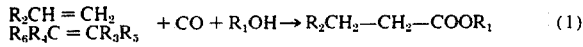

$$R_2CH=CH_2 \atop R_6R_4C=CR_3R_5 \quad + CO + R_1OH \rightarrow R_2CH_2-CH_2-COOR_1 \quad (1)$$

wherein $R_1$ may be hydrogen, alkyl, cycloalkyl, aryl, substituted alkyl or substituted aryl, $R_2$, $R_3$ and $R_4$ may be hydrogen or the same or different alkyl, cycloalkyl or substituted alkyl, and $R_5$ and $R_6$ may be alkyl, cycloalkyl or substituted alkyl. Suitable alpha and internal olefins, and hydroxylated coreactants are exemplified below.

BACKGROUND OF THE INVENTION

Production of linear fatty acids now exceeds a billion pounds a year in the United States alone. While the largest and principal source is derived from coconut oil, work by Reppe*, Butter (U.S. Pat. No. 3,700,706) Von Kutepow et al. (U.S. Pat. No. 3,437,676), Fenton (U.S. Pat. No. 3,641,074), Parshall (U.S. Pat. No. 3,657,368), as well as applicant's parent application (See supra) all utilize olefins as charge stocks in catalytic processes for the preparation of carboxylic acid and their esters. However, insofar as is known, none of these references discloses processes for converting $\alpha$ or 1-olefins present in mixtures of $\alpha$ and internal olefins to the linear alkanoic acids or esters to the virtual exclusion of the internal olefins present. The discovery of catalysts which perform this function, and the determination of the necessary reaction parameters such as temperatures, and pressures, as well as the ratios and concentrations of the reaction mixture components, distinguishes the novel process of this invention from the cited art. Inasmuch as even the activity of a particular catalyst in converting a given olefin to the linear alkanoic (fatty) acid is affected by the choice of platinum or palladium, the particular Group VB or VIB element employed in the stabilizing ligand and the choice of Group IVB metal halide, it can be appreciated that the inventive process could not have been predicted, and would therefore be unobvious in view of the art which appears above.

*"Carbon Monoxide in Organic Synthesis", J. Falbe, Chapter 2 (1970)

In particular, it has now been found that whereas ligand-stabilized platinum(II) halide complexes in combination with Group IVB metal halides, are effective catalysts for the selective carboxylation of $\alpha$-olefin, internal olefin mixtures, analogous palladium catalysts, while active for carboxylation*, are not effective for the selective carboxylation reaction described supra.

*See application U.S. Pat. No. 3,819,669 and U.S. Pat. No. 3,700,706

In the broadest contemplated practice of the inventive process, selective conversion of $\alpha$-olefins contained in oxidizer-free reaction mixtures of $\alpha$-olefins-internal olefins, to linear alkanoic acids or esters is achieved by:

a. contacting said olefin mixture with carbon monoxide and hydroxyl containing coreactant, in the presence of a catalytic quantity of a three component catalyst, consisting of:
 1. a platinum(II) dihalide,
 2. at least one Group VB** donor ligand, combined with
 3. a Group IVB** metal halide co-catalyst, and b. heating said oxidizer-free reaction mixture containing both $\alpha$-olefins and internal olefins to between 25° and 125°C at superatmospheric pressures of from 100 psig to 4000 psig provided by a substantially carbon monoxide atmosphere until about 10 to 90 percent of the $\alpha$-olefins present are converted to linear fatty acids or esters, and optionally separating the linear alkanoic acid or ester contained therein.

**As defined in Advanced Chemistry by F. A. Cotton and G. Wilkinson, 2nd Ed.

Whether linear alkanoic (fatty) acids or their esters are formed is dependent upon the nature of the hydroxyl-containing coreactant. As will be expounded upon more fully infra, when $R_1OH$ in equation 1 is water and this coreactant is present in at least stoichiometric quantities (based upon the quantity of $\alpha$-olefins present) then the major product is an alkanoic (fatty) acid, whereas when the desired product is the ester of the fatty acid, at least stoichiometric amounts of alkanol-type coreactants are required, and $R_1$ may be alkyl, cycloalkyl, aryl, substituted aryl or substituted alkyl.

In a preferred and more specific embodiment of the above-described process, linear alkanoic (i.e. fatty or saturated aliphatic) acid or ester products, selected from the group consisting of linear alkanoic acids and linear alkanoic esters of said acids, containing from 3 to 31 carbon atoms, are prepared by the catalytic reaction of carbon monoxide with alpha olefins containing from 2 to 30 carbon atoms, in a mixture of an $\alpha$-olefin-internal olefins containing 2 to 30 carbon atoms, by:

a. admixing each mole of said olefin mixture to be carboxylated, in a deoxygenated reaction environment, with from 0.001 to 0.02 mole of said catalyst complex (described generically above), with at least sufficient hydroxyl-containing reactant to satisfy the stoichiometry of the carboxylation reaction, and in the presence of sufficient inert solvent to disperse the components of the admixture to form a homogeneous reaction mixture.

b. pressurizing said reaction mixture to between about 1500 psig to 3000 psig with at least sufficient carbon monoxide to satisfy the stoichiometry of the carboxylation reaction referred to supra;

c. heating said pressurized reaction mixture to temperatures between 60°C to 90°C, until about 10 to about 90 percent of the alpha olefins containing in said olefin mixture are converted to carboxylated products, then d. isolating said linear carboxylated products contained therein.

In order to further aid in the understanding of this invention, the following additional disclosure is submitted.

A. PROCESS SEQUENCE AND VARIATIONS

In general, the components of the carboxylation reaction mixture, including optional inert solvent, alpha-olefin-internal olefin mixture and homogeneous, ligand-stabilized platinum(II) halide-Group IVB metal halide catalyst may be added in any sequence as long as good agitation is employed to provide a uniform dispersion or a homogeneous reaction mixture. Useful modifications include:

1. The catalyst may be preformed and added preformed to the reaction solvent prior to the addition of the olefin mixture and other solvent components.

2. Preferably, to minimize stability problems with the catalyst, the catalyst is best formed in situ usually by mixing the deoxygenated inert solvent and neat olefin mixture, followed by the addition of the excess metal halide of Group IVB, and finally by the addition of the ligand-stabilized platinum(II) halide complex to form the reaction mixture.

3. After using either variation 1 or 2, the deoxygenated catalyst containing reaction mixture is pressurized with CO or inert gas initially at low pressures (10–100 psig) and heated while increasing the pressure between about 1500 psig and 3000 psig until the carboxylated product is formed.

4. An especially preferred modification, which minimizes both the induction period and the isomerization of the olefin mixture is the following: the catalyst is formed in a deoxygenated solvent; the catalyst solution is pressurized with a small pressure of carbon monoxide and heated to the desired reaction temperature; the olefin mixture is then added neat or dissolved in a suitable inert solvent and the pressure raised to the desired level with carbon monoxide. The reaction mixture is agitated under the pressurized CO atmosphere at the desired reaction temperature until the desired alkanoic acid or ester product is formed.

B. THREE COMPONENT LIGAND-STABILIZED HOMOGENEOUS PLATINUM(II)-GROUP IVB METAL HALIDE CATALYST COMPOSITIONS

The ligand-stabilized platinum(II) halides, Group IVB metal halide complexes are known in the literature and methods for their preparation have been described*. One convenient mode of preparation in situ is to mix a solution of ligand stabilized platinum(II) halide complex, such as $PtCl_2[As(C_6H_5)_3]_2$, with a large molar excess of Group IVB metal halide, preferentially $SnCl_2$.

*For example: R. D. Cramer et al., J. A. Chem. Soc., 85, 1691 (1963)

The three component, homogeneous platinum(II) catalyst compositions consist essentially of:

1. platinum(II) halides,
2. Group VB or VIB donor ligands, and
3. Group IVB metal halides.

1. The platinum(II) halide component employed in the catalyst composition are preferably the dichloride or the less productive dibromide salts in that order. These dihalides, in order to be effective for the selective and preferential carboxylation of α-olefins with the virtual exclusion of internal olefins, must include at least one Group VB or VIB donor ligand and Group IVB metal halides, described more fully below:

2. Each Group VB or VIB donor ligand contains one or more nitrogen, phosphorus, arsenic or sulfur atoms, bonded to hydrocarbyl radicals containing one to 20 carbon atoms, said radicals being selected from the group consisting of aryl, alkyl and substituted aryl radicals. Group VB and VIB donor ligands which can be used to stabilize the platinum(II) halides include triphenylarsine, triphenylphosphine, tri-p-tolylphosphine, tri-p-methoxyphenylphosphine, triphenylphosphite, bis(1,2-diphenylphosphino)ethane, tri(4-chlorophenyl)phosphine, tricyclohexylphosphine, dimethylphenylphosphine, bis(1,2-diphenylarsino)ethane, 1,10-phenanthroline, bipyridyl and diphenylsulphide.

Excess amounts of Group VB or VIB donor ligand over that amount required to form a complex with the platinum halide may be used with the obtainment of increased yields of desired linear alkanoic acid or ester product in certain instances.

3. Group IVB metal halides which can be utilized with the first two components [platinum(II) halides and Group VB or VIB donor ligands] include anhydrous tin(II) chloride, tin(II) chloride dihydrate, tin(II) bromide, lead chloride, tin(IV) chloride, and germanium(II) chloride.

While the molar ratio of Group IVB metal halide, exemplified by tin(II) chloride, to the ligand-stabilized platinum(II) halide complex exemplified by $PtCl_2[As(C_6H_5)_3]_2$ is not critical, the experimental work performed indicates that a molar excess of tin(II) chloride for each mole of ligand-stabilized platinum(II) chloride complex is required for reproducibility and good selectivity to the desired linear alkanoic acid or ester. Preferably a ratio of from about 2 to 10 moles of tin(II) chloride for each mole of $PtCl_2[As(C_6H_5)_3]_2$ complex gives the optimum amount of linear alkanoic acid or ester.

While many platinum(II) halide carboxylation catalysts can be prepared by combining one of each of the three illustrated groups of components, the only practical method to define which carboxylation catalysts are capable of selective carboxylation of alpha olefins contained in alpha olefins-internal olefin mixture is by the following procedure:

1. Prepare the catalysts and experimentally determine which of the catalysts exhibit the necessary selectivity at reaction parameters such as concentrations, temperatures, pressures and the like, and 2. Determine some indices which can be used as the measuring point at which the desired selective carboxylation reaction can be terminated without carboxylating the less reactive internal olefins.

It has been found that at a conversion level of alpha olefins ranging from 10 to 90 percent, the following catalysts chosen from the group consisting of:

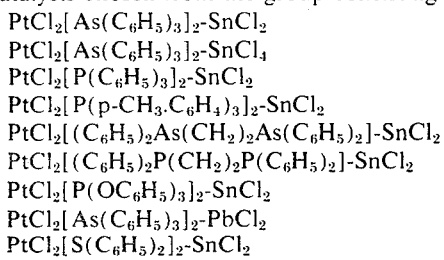

PtCl$_2$[As(C$_6$H$_5$)$_3$]$_2$-SnCl$_2$
PtCl$_2$[As(C$_6$H$_5$)$_3$]$_2$-SnCl$_4$
PtCl$_2$[P(C$_6$H$_5$)$_3$]$_2$-SnCl$_2$
PtCl$_2$[P(p-CH$_3$·C$_6$H$_4$)$_3$]$_2$-SnCl$_2$
PtCl$_2$[(C$_6$H$_5$)$_2$As(CH$_2$)$_2$As(C$_6$H$_5$)$_2$]-SnCl$_2$
PtCl$_2$[(C$_6$H$_5$)$_2$P(CH$_2$)$_2$P(C$_6$H$_5$)$_2$]-SnCl$_2$
PtCl$_2$[P(OC$_6$H$_5$)$_3$]$_2$-SnCl$_2$
PtCl$_2$[As(C$_6$H$_5$)$_3$]$_2$-PbCl$_2$
PtCl$_2$[S(C$_6$H$_5$)$_2$]$_2$-SnCl$_2$ give linear alkanoic acids or esters selectively under conditions described below, without substantial carboxylation of the internal olefin fraction.

Tables I and II show evidence of the suitability of the above experimentally derived class of ligand-stabilized platinum(II) halide-Group IVB metal halide complexes which function as selective carboxylation catalysts for α-olefins contained in α-olefin-internal olefin mixtures.

It should be noted that Table II includes run data on analogous ligand-stabilized palladium(II) halide complexes with Group IVB metal halides, these are not effective catalysts for the selective carboxylation of α-olefin-internal olefin mixtures.

C. TEMPERATURE REQUIRED FOR SELECTIVE CARBOXYLATION

The temperature range which can be employed for selective carboxylation is a variable which is dependent upon experimental factors including the olefin employed, the total pressure, the concentrations of reactants and catalyst and particularly the choice of ligand stabilized platinum(II)-Group IVB metal halide catalyst, among other things. Using an alpha olefin-internal olefin mixture containing a typical linear alpha olefin such as 1-heptene and PtCl$_2$[As(C$_6$H$_5$)$_3$]$_2$-SnCl$_2$ as a representative catalyst, an operable temperature range is from 25° to 125°C. A preferred operating range is from about 60° to 90°C at superatmospheric pressures of from 1500 to 3000 psig.

D. PRESSURES REQUIRED FOR SELECTIVE CARBOXYLATION

The pressure range which can be employed is also a variable dependent on the factors mentioned above. Using PtCl$_2$[As(C$_6$H$_5$)$_3$]$_2$-SnCl$_2$ as a representative catalyst, and 1-heptene as the linear alpha olefin component, an operable pressure range is from 100 to about 4000 psig, preferebly from 1500 to about 3000 psig when a temperature range of from about 60°C to 90°C is employed.

E. HYDROXYLATED CO-REACTANT

This term, as employed throughout this application, refers to hydroxyl containing reactants which contain at least one hydroxyl group which is sufficiently labile during the reaction conditions of the carboxylation reaction to produce the desired carboxylated product. Illustrative suitable hydroxyl-containing coreactants include water, primary or secondary alcohols including methanol, ethanol, n-propanol, iso-propanol, 2-ethylhexanol, cyclohexanol, n-dedecanol, phenol and substituted phenols, substituted alcohols such as 2-chloroethanol, and polyols including ethylene glycol, glycerol, sorbitol and the like.

F. REACTION TIMES REQUIRED

As previously indicated in the analogous discussion above, experimental variables are important in arriving at reaction times. Generally, substantial conversions (about 10 to 90 percent) of the alph-olefin-internal olefin mixture to the linear paraffinic carboxylate can almost always be accomplished within 12 hours, with 2 to 6 hours representing the more usual reaction time interval.

G. RATIO OF LIGAND-STABILIZED PLATINUM(II) CATALYST COMPLEX TO TOTAL OLEFIN SUBSTRATE

Experimental work indicates that a molar ratio of up to about 500 moles of 1000 moles of total olefin (alpha olefin plus internal olefin) per mole of platinum metal complex can be employed in most instances. This minimal ratio of about 0.001 moles of catalyst per mole of total olefin is herein referred to as a "catalytic ratio" or "catalytic amount." Much lower ratios (i.e. 25 moles of olefin substrate per mole of platinum catalyst complex) are not harmful but are economically unattractive. For this reason the favored mole ratio range arrived at in Tables I and II ranges from 50 to 500 moles of total olefin per mole of platinum or palladium catalyst complex.

H. INERT SOLVENTS

The selective and substantially quantitative carboxylation of α-olefins in α-olefin-internal olefin mixtures is run most conveniently in the presence of an inert diluent. Experimental data indicate the preferred solvents are polar ketones such as acetone, methylethylketone, diethylketone, methylpropylketone, methylisobutylketone, and acetophenone. However, other solvents inert to carboxylation can be used. These include aromatics such as benzene, toluene, xylenes and the like. Preferably the reaction is run in the presence of sufficient inert solvent to solubilize the components of the reaction mixture. Excess inert solvent does not appear to be harmful.

I. ALPHA AND INTERNAL OLEFINS IN THE OLEFIN MIXTURE AS SUBSTRATES

The alpha olefins or 1-alkenes in the alpha olefin-internal olefin mixture can range in carbon content from 2 up to 30 carbon atoms. These substrates contain 1 double bond. A favored range of alpha-olefins are those containing 3 to 14 carbon atoms. Illustrative alpha (α) or 1-alkene substrates include 1-propene, 1-butene, 1-pentene, 1-hexene, 1-heptene, 1-octene, 1-nonene, 1-decene and 1-tetradecene. Internal olefin substrates in the mixture may also contain from 2 to 30 carbon atoms. The carbon range spread between the alpha olefins in the mixture does not appear to be critical to success. For example, preferential carboxylation between 1-alkenes and internal alkenes has been observed when the alpha-olefin-internal olefin has the same number of carbon atoms.

Illustrative internal olefins which can be present in the alpha olefin-internal mixture include linear internal olefins such as 2-hexene, 2-pentene, 2-octene, 5-decene, 4-octene, etc., cyclic olefins including cyclohexene, 1-methyl-1-cycloheptene, cyclooctene, etc., and branched internal olefins such as 3-ethyl-2-pentene, 2-methyl-2-butene, etc. These olefins substrates may be utilized in conjunction with one or more inert background solvents such as those mentioned above. The olefins can be in the form of single, discrete compounds, or in the form of mixtures of olefins with or without large quantities of saturated hydrocarbon. Insofar as is known the ratio of alpha-olefin to internal olefins is not critical as long as at least initially 10 mole percent of the olefin mixture is alpha-olefin. Tables I and II show data for the carboxylation of various, alpha-olefin-internal olefin mixtures.

J. BY-PRODUCTS

The inventive process leads to the formation of only two minor classes of by-products. These are:

1. additional internal olefins, due to alpha-olefin isomerization, and
2. branched (2-alkyl) acids or esters due to carbon monoxide addition at the second carbon of the alpha olefins in the charge, as given by equation (2):

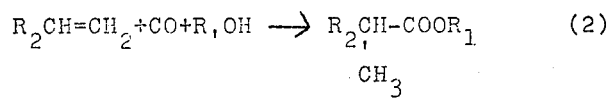

These two by-products normally make up less than 10 percent by weight of the products obtained. Gas chromatography is used to follow the course of carboxylation.

The by-products may be separated from the linear alkanoic acids or ester derivatives by the usual chemical or physical techniques, such as distillation, solvent extraction, chromatography, etc.

K. IDENTIFICATION PROCEDURES are by one or more of the following analytical procedures - gas chromatography (g.c.) infrared, elemental analysis and nuclear magnetic resonance. Unless otherwise specified all percentages are by mole ratio rather than weight or volume, and all temperatures are in centigrade rather than fahrenheit.

L. CONVERSION as defined herein represents the extent of transformation of the reactant olefin to other products. Conversion is expressed as a percentile and is calculated by dividing the amount of olefin consumed during carboxylation by the amount of olefin originally charged and multiplying the quotient by 100.

M. YIELD as defined herein, represents the efficiency in catalyzing the desired linear carboxylation reaction relative to other undesired reactions. In this instance carboxylation of 1-alkenes (or alpha olefins) to linear alkanoic acids (or esters) is the desired conversion. Yield is expressed as a percentile, and is calculated by determining the amount of linear alkanoic acid or ester product formed, divided by the amount of linear alkanoic acid or ester product which theoretically can be formed and multiplying the quotient obtained by 100.

N. SELECTIVITY as defined herein is the efficiency in catalyzing the desired carboxylation reaction to the linear paraffinic carboxylated product relative to other undesired (principally internal carboxylation) reactions. When α-olefins in α-olefin-internal olefin mixtures are to be carboxylated, formation of the linear alkanoic acid or ester is the desired conversion. Selectivity is expressed as a percentile, and is calculated by determining the amount of linear alkanoic acid or ester formed, divided by the total amount of alkanoic acid or ester (linear and branched chain) products formed and multiplying the quotient obtained by 100.

Having described the inventive process in general terms, the following examples are submitted to supply specific and illustrative embodiments.

EXAMPLE 1

SELECTIVE AND PREFERENTIAL CARBOXYLATION OF 1-HEPTENE IN A 1-HEPTENE-2-OCTENE MIXTURE USING $PtCl_2[As(C_6H_5)_3]_2$-$SnCl_2$ AS CATALYST

To an appropriately sized glass lined, mechanically stirred, autoclave charged with 75 ml of deoxygenated methylisobutylketone (MIBK) and 8 ml of methanol (200 mmole) is added, under nitrogen purge, 1.12 g of $SnCl_2.2H_2O$ (5.0 mmole), 0.44 g of $PtCl_2[As(C_6H_5)_3]_2$ (0.5 mmole) previously preformed, and an equimolar mixture of 1-heptene (7.0 ml, 50 mmole) and 2-octene (7.8 ml, 50 mmole). The components are stirred for 5 minutes producing a reddish-colored catalyst solution. The autoclave containing the reaction mixture is then sealed, deoxygenated, pressurized to 3000 psig with carbon monoxide and heated to 80°C for 3 hours with agitation. Samples are then taken for analysis at periodic intervals. At the end of this time, the autoclave is cooled down, vented, and the reaction mixture analyzed by gas chromatograph producing the following data:

| a) For the 1-Heptene Fraction | |
|---|---|
| 1-Heptene conversion (mole, %) | 53 |
| Major product ester | methyl octanoate |
| Methyl octanoate selectivity (mole ratio % of linear to total ester) | 89 |
| Yield of methyl octanoate (mole %, based on 1-heptene charged) | 46 |
| b) For the 2-Octene Fraction | |
| 2-Octene conversion (mole, %) | 5.8 |
| Methyl ester products | None |

The above run shows that with the $PtCl_2[As(C_6H_5)_2]_2$-$SnCl_2$ catalyst, linear α-olefins, such as 1-heptene, can be selectively carboxylated in the presence of equimolar amounts of internal olefins. Further, the selectivity to the linear ester product, methyl octanoate, is substantially the same as that obtained when a control run of 1-heptene is made under the same conditions and the same catalyst.

EXAMPLES 2 TO 5

SELECTIVE AND PREFERENTIAL CARBOXYLATION OF VARIOUS ALPHA OLEFIN-INTERNAL OLEFIN MIXTURES USING $PtCl_2[As(C_6H_5)_3]_2$-$SnCl_2$ AS CATALYST

Using the same catalyst system, same solvents, reaction parameters (i.e. temperature and pressure) and apparatus, the work of Example 1 is repeated except that the composition of the α-olefin-internal olefin mixture is varied, and the mole ratio of α-olefin to internal olefin is also varied. The results appear in Table I. In all instances, when the monitoring of the reactions indicate between 40 and 80 percent conversion, the reactions are terminated and analyzed. In each instance selectivity of the linear alkanoic acids or their esters range between 89 and 92 percent and yields of the linear carboxylated product varies between 28 and 73 percent

EXAMPLES 6 TO 11

FURTHER SELECTIVE CARBOXYLATIONS OF VARIOUS ALPHA OLEFIN-INTERNAL OLEFIN MIXTURES USING VARIOUS LIGAND-STABILIZED PLATINUM(II)-GROUP IVB METAL HALIDES AS CATALYSTS.

In these examples, summarized in Table II, the procedure is similar to that of Example 1. The major differences of substance are in the composition of the ligand-stabilized platinum(II)-Group IVB metal halide catalyst, the identity of the components of the olefin mixture, and the initial molar ratios of α-olefin to internal olefin, and of total olefin charge (alpha olefin plus internal olefin) to platinum(II) catalyst complex.

As the data in Table II show, the primary reaction in Examples 6 through 9 is selective carboxylation of the alpha (α) olefin fraction. Other ligand-stabilized platinum(II) halide-Group IVB metal halide complexes which exhibit similar selectivities include $PtCl_2[(C_6H_5)_2P(CH_2)_2P(C_6H_5)_2]-SnCl_2$, $PtCl_2(1,10$-phenanthroline$)-SnCl_2$, $PtCl_2[P(C_6H_5)_3]_2-SnCl_2$, $PtCl_2[P(OC_6H_5)_3]_2-SnCl_2$, and $PtCl_2[As(C_6H_5)_3]_2-PbCl_2$. It should also be noted that:

a. Selective carboxylation of α-olefins to the linear methyl esters takes place even when the reaction mixture contains several different α-olefins and internal olefins (See Example 9).

b. While ligand-stabilized palladium(II) halide-Group IVB metal halide complexes are known catalysts for the carboxylation of α-olefins alone to linear fatty acids or ester derivatives*, they are not suitable for the selective carboxylation of α-olefins in α-olefin-internal olefin mixtures (See Examples 10 and 11).

*Application 223,015 and U.S. Pat. No. 3,700,706

TABLE I

THE SELECTIVE CARBOXYLATION OF OLEFIN MIXTURES - $[(C_6H_5)_3As]_2PtCl_2-SnCl_2 \cdot 2H_2O$ CATALYST[a]

| Example | Olefin | Olefin/Pt Ratio | Olefin Conv. (%) | Major Acid Ester Products Identity | Selectivity (%)[b] | Yield (%)[c] |
|---|---|---|---|---|---|---|
| 2 | 1-Heptene | 100 | 53 | Methyl Octanoate | 89 | 46 |
|  | 2-Octene | 100 | 5.8 | None | — | — |
| 3 | 1-Heptene | 100 | 41 | Methyl Octanoate | 92 | 28 |
|  | Trans-2-Heptene | 100 | None | None | — | — |
|  | Trans-5-Decene | 50 | None | None | — | — |
| 4 | 1-Decene | 100 | 40 | Methyl Undecanoate | 91 | 36 |
|  | Trans-2-Heptene | 100 | None[d] | None | — | — |
| 5 | 1-Decene | 50 | 78 | Methyl Undecanoate | 92 | 73 |
|  | 2-Octene | 50 | 17 | $C_9$ Methyl Esters | N.D.[e] | <1 |

[a]Run Conditions: 80°C, 3000 psig of CO, 180 Min, Excess methanol present
[b]Selectivity to Linear Ester. Calculated from: Linear Ester/Total Ester
[c]Yield of Major Product Based on Olefin Charged.
[d]3.3 percent isomerization of the Trans-2-Heptene to other Isomers.
[e]N.D. = Not Determined.

TABLE II

THE SELECTIVE CARBOXYLATION OF OLEFIN MIXTURES[a]

| Example | Catalyst Composition | Olefin Mixture | Olefin/Pt or Pd Mole Ratio | Olefin Conv.(%) | Major Acid Ester Products Identity | Selectivity (%)[b] | Yield (%)[c] |
|---|---|---|---|---|---|---|---|
| 6 | $PtCl_2[P(p-CH_3 \cdot C_6H_4)_3]_2-SnCl_2$ | 1-Tetradecene | 25 | 13 | Methyl Pentadecanoate | 87 | 10 |
|  |  | 5-Decene | 25 | 2 | None | — | — |
| 7 | $PtCl_2[S(C_6H_5)_3]_2-SnCl_2$ | 1-Nonene | 50 | 10 | Methyl Decanoate | 89 | 5 |
|  |  | 2-Methyl-2-Butene | 450 | 1.7 | None | — | — |
| 8 | $PtCl_2[(C_6H_5)_2AS(CH_2)_2 As(C_6H_5)_2]-SnCl_2$ | 1-Octene | 450 | 5 | Methyl Nonanoate | 90 | 4.9 |
|  |  | 1-Methyl-1-Cycloheptene | 50 | 9.5 | None | — | — |
| 9 | $PtCl_2[As(C_6H_5)_3]_2-SnCl_4$ | 1-Heptene | 50 | 29 | Methyl Octanoate | 91.9 | 28 |
|  |  | 1-Decene | 50 | 28 | Methyl Undecanoate | 95.0 | 28 |
|  |  | 2-Hexene | 50 | 6.7 | Methyl 2-Methylhexanoate | 10 | 1.5 |
|  |  | 2-Octene | 50 | 1 | None | — | — |
| 10 | $PdCl_2[P(C_6H_5)_3]_2-SnCl_2$ | 1-Decene | 100 | <1 | None | — | — |
|  |  | 2-Octene | 100 | 2.2 | None | — | — |
| 11 | $PdCl_2[P(p-CH_3 \cdot C_6H_4)_3]_2-SnCl_2$[d] | 1-Decene | 100 | 92 | Methyl Undecanoate | 85 | 76 |
|  |  | Trans-2-Heptene | 50 | 68 | $C_9$ Branched Methyl Esters[e] | 12 | 59 |

[a]Run Conditions: 80–90°C, 3000 psig of CO, Excess Methanol present
[b]Selectivity to Linear Ester. Calculated from: Linear Ester/Total Ester
[c]Yield of Major Product based on Olefin charged.
[d]Run Conditions: 70°C, 2000 psig of CO, Excess Methanol
[e]Major Components: Methyl 2-Methyl Heptanoate (61%) and Methyl 2-Ethyl Hexanoate (27%)

EXAMPLE 12

PREFERENTIAL CARBOXYLATION OF PROPENE IN A PROPENE-2-HEXENE MIXTURE USING $PtCl_2[As(C_6H_5)_3]_2$-$SnCl_2$ AS CATALYST AND n-PROPANOL AS THE HYDROXYLATED CO-REACTANT

This experiment is quite similar to Example 1, in that the apparatus, operating procedure, catalyst, temperature and CO pressure is unchanged, however, in this run the olefin charge is a mixture of propene and 2-hexene (mole ratio 3:1), the solvent is benzene, and the hydroxylated co-reactant is n-propanol. The results are as follows:

| | | |
|---|---|---|
| a) | For the Propene Fraction | |
| | Propene Conversion (mole,%) | 10 |
| | Major product ester | propyl butyrate |
| | Propyl butyrate selectivity (mole,%, ratio of linear to total ester) | 87 |
| | Yield of Propyl butyrate (mole,%, based on propene charged) | 8.8 |
| b) | For the 2-Hexene Fraction | |
| | 2-Hexene conversion (mole,%) | 0.8 |
| | Propyl ester products | None |

EXAMPLES 13 AND 14

SELECTIVE CARBOXYLATION OF 1-HEPTENE-2-OCTENE MIXTURE USING $PtCl_2[As(C_6H_5)_3]_2$-$SnCl_2$ AS CATALYST - TEMPERATURE AND PRESSURE EFFECTS

Using the same catalyst system, olefin mixture, solvent and apparatus, the work of Example 1 is repeated except that in Example 13 the reaction temperature is 60°C, and the applied CO pressure is 3000 psig, while in Example 14, the reactor is pressurized to 1500 psig of carbon monoxide and heated to 90°C. In each instance selectivity to the linear alkanoic ester, methyl octanoate, ranges between 85 and 92 percent, and the yield of methyl octanoate is in excess of 50 percent, while conversion of the 2-octene fraction is less than 5 percent.

As the numerous examples of this invention indicate, the subject invention is advantageous in several respects compared to corresponding carboxylation process of the prior art. For example, using various empirically derived ligand-stabilized platinum(II) halide-Group IVB metal halide (3 component) catalyst complexes, 1-alkenes contained in mixtures with internal linear and branched alkenes, and cycloalkenes, can be selectively and preferentially carboxylated to linear alkanoic acids or esters at relatively mild reaction conditions of temperature and pressure, even when there is little or no spread in carbon content between 1-alkenes and internal alkenes in the mixture. Further selectivities to the 1-alkanoic acids and esters are generally excellent, and competing isomerization and reduction reactions are kept to a minimum by terminating the reaction when 10 percent to 90 percent of the 1-alkenes are converted. In addition, large ratios of alkene to catalyst may be employed and generally most oxygenated and aromatic solvents are suitable as reaction media.

Finally, the invention is quite advantageous in that numerous substitutions, modifications and changes can be made without departing from the inventive concept.

The scope of the subject invention can best be understood by examining the claims which follow, in conjunction with the preceding specification.

What is claimed is:

1. A process for selectively carboxylating alpha ($\alpha$) olefins contained in mixtures of alpha-olefins and internal olefins to linear alkanoic acid or ester products, wherein said alpha olefins in the mixture constitute from 10 to 90 mole percent of the olefin mixture, said olefins containing from 2 to 30 carbon atoms, by:

a. contacting each mole of said olefin mixture with carbon monoxide and hydroxyl containing coreactant selected from the group consisting of water and alcohols, in the presence of from about 0.001 to 0.02 mole of a three component catalyst consisting of ligand-stabilized platinum (II) dihalide complexes in combination with Group IVB metal halides, said catalyst being selected from the group consisting of:

$PtCl_2[As(C_6H_5)_3]_2$-$SnCl_2$
$PtCl_2[As(C_6H_5)_3]_2$-$SnCl_4$
$PtCl_2[P(p-CH_3.C_6H_4)_3]_2$-$SnCl_2$
$PtCl_2[S(C_6H_5)_2]_2$-$SnCl_2$ with sufficient inert solvent to disperse the components of the admixture, to form a deoxygenated reaction mixture, b. pressurizing said reaction mixture to between about 1500 psig to 3000 psig with at least sufficient carbon monoxide and hydroxyl containing coreactant to satisfy the stoichiometry of the carboxylation reaction, c. heating said pressurized reaction admixture between 60° to 90°C, until between about 10 and 90 percent of said alpha olefins contained in said olefin mixture is converted to alkanoic acid or ester products, and then d. isolating said alkanoic acid or ester products contained therein.

2. The process of claim 1 wherein the hydroxylated coreactant is an alkanol containing 1 to 12 carbon atoms.

3. The process of claim 1 wherein the hydroxylated coreactant is water.

4. The process of claim 2 wherein the alkanol is methanol, and the alkanoic acid ester products are methyl esters.

5. The process of claim 1 wherein the inert solvent is selected from the group of polar ketones consisting of acetone, methylisobutylketone, diethylketone, methylpropylketone, methylethylketone, and acetophenone.

6. The process of claim 1 wherein the inert solvent is selected from the group of aromatic solvents consisting of benzene, toluene and xylenes.

7. The process of claim 1 wherein said alpha-olefin fraction present in the alpha-olefin-internal olefin mixture consists of a mixture of different alpha-olefins.

8. The process of claim 7 wherein said alpha-olefins are selected from the group consisting of propene, 1-heptene, 1-nonene, 1-decene and 1-tetradecene.

9. The process of claim 1 wherein said internal olefin fraction present in the alpha-olefin-internal olefin mixture is selected from the group consisting of linear internal olefins, cyclic olefins and branched internal olefins.

10. The process of claim 9 wherein said internal olefins are selected from the group consisting of 2-hexene, 2-octene, 5-decene, cyclohexene, 1-methyl-1- cycloheptene, 2-ethyl-2-pentene and 2-methyl-2-butene.

11. The process of claim 1, wherein said homogeneous, ligand-stabilized platinum(II) dihalide-Group IVB metal halide catalyst is prepared in situ by adding as separate components the stabilizing ligand, platinum(II) halide and Group IVB metal halide.

* * * * *

UNITED STATES PATENT OFFICE
CERTIFICATE OF CORRECTION

Patent No. 3,892,788  Dated July 1, 1975

Inventor(s) John F. Knifton

It is certified that error appears in the above-identified patent and that said Letters Patent are hereby corrected as shown below:

The term of this patent subsequent to June 25, 1991, has been disclaimed.

Signed and Sealed this twenty-second Day of June 1976

[SEAL]

Attest:

RUTH C. MASON
Attesting Officer

C. MARSHALL DANN
Commissioner of Patents and Trademarks